US011310643B2

(12) United States Patent
Smith et al.

(10) Patent No.: US 11,310,643 B2
(45) Date of Patent: Apr. 19, 2022

(54) SUBJECT MATCHING FOR DISTRIBUTED ACCESS CONTROL SCENARIOS

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 16/608,771

(22) PCT Filed: May 9, 2017

(86) PCT No.: PCT/US2017/031762
§ 371 (c)(1),
(2) Date: Oct. 25, 2019

(87) PCT Pub. No.: WO2018/208290
PCT Pub. Date: Nov. 15, 2018

(65) Prior Publication Data
US 2020/0204556 A1 Jun. 25, 2020

(51) Int. Cl.
*H04W 4/70* (2018.01)
*H04W 12/08* (2021.01)
(Continued)

(52) U.S. Cl.
CPC ............ *H04W 4/70* (2018.02); *H04L 63/101* (2013.01); *H04L 63/105* (2013.01); *H04L 63/20* (2013.01); *H04W 12/06* (2013.01); *H04W 12/08* (2013.01)

(58) Field of Classification Search
CPC ....... H04W 4/70; H04W 12/06; H04W 12/08; H04L 63/101; H04L 63/105; H04L 63/20
(Continued)

(56) References Cited

U.S. PATENT DOCUMENTS

| 8,196,187 | B2 * | 6/2012 | Kabat ................. G06F 21/6218 726/4 |
| 2008/0184336 | A1 | 7/2008 | Sarukkai et al. |
| 2011/0173679 | A1 * | 7/2011 | Perumal ............. G06F 21/6218 726/4 |

FOREIGN PATENT DOCUMENTS

| WO | WO-2017027246 A1 | 2/2017 |
| WO | WO-2018208290 A1 | 11/2018 |

OTHER PUBLICATIONS

Hu et al. 2015 IEEE 16th International Conference on Information Reuse and Integration, "Implementing and Managing Policy Rules in Attribute Based Access Control", pp. 518-525 (Year: 2015).*

(Continued)

*Primary Examiner* — Khalil Naghdali
(74) *Attorney, Agent, or Firm* — Schwegman Lundberg & Woessner, P.A.

(57) ABSTRACT

Various systems and methods for implementing an access control policy that provides subject matching in distributed access control scenarios, such as Internet of Things (IoT) device interconnection settings, are described. In an example, a determining an access control policy with an access evaluator includes: receiving a request from a subject to perform an operation with an object; evaluating the first type of access policy of the subject, and a second type of access policy of the object, to determine a first and second access scope for performing the requested operation; identifying an access control object that provides a mapping between the first access scope and the second access scope for performing the requested operation; and providing access from the subject to the object based on a security level determined from the mapping between the first access scope and the second access scope provided with the access control object.

25 Claims, 10 Drawing Sheets

(51) Int. Cl.
*H04L 29/06* (2006.01)
*H04W 12/06* (2021.01)

(58) Field of Classification Search
USPC .............................................. 726/4
See application file for complete search history.

(56) References Cited

OTHER PUBLICATIONS

Jun et al., 2009 IEEE International Conference on Management and Service Science, MASS, "Research on Hierarchical Policy-based Access Control Model for Web Services" (Year: 2009).*
"International Application Serial No. PCT US2017 031762, International Preliminary Report on Patentability dated Nov. 21, 2019", 9 pgs.
"International Application Serial No. PCT/US2017/031762, International Search Report dated Nov. 21, 2017", 6 pgs.
"International Application Serial No. PCT/US2017/031762, Written Opinion dated Nov. 21, 2017", 9 pgs.
Ocf et al., "OCF Overview Introduction Feb. 2016", TP-2016-0124-OCF Overview Introduction_-_2016-02.PPTX PPTX ONEM2M, vol. Technical Plenary TP, XP084016937, [Online] retrieved from the internet: <URL://memberonem2m org/Application/documentapp/downloadininediate/defaultaspxdocID17314>, (May 18, 2016), 1-118.

* cited by examiner

SUBJECT MATCHING FOR DISTRIBUTED ACCESS CONTROL SCENARIOS

PRIORITY APPLICATION

This application is a U.S. National Stage Application under 35 U.S.C. 371 from International Application No. PCT/US2017/031762, filed May 9, 2017, published as WO 2018/208290, which is incorporated herein by reference in its entirety.

TECHNICAL FIELD

Embodiments described herein generally relate to processing techniques used with data communications and interconnected device networks, and in particular, to security techniques applied within internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

Figure 1:
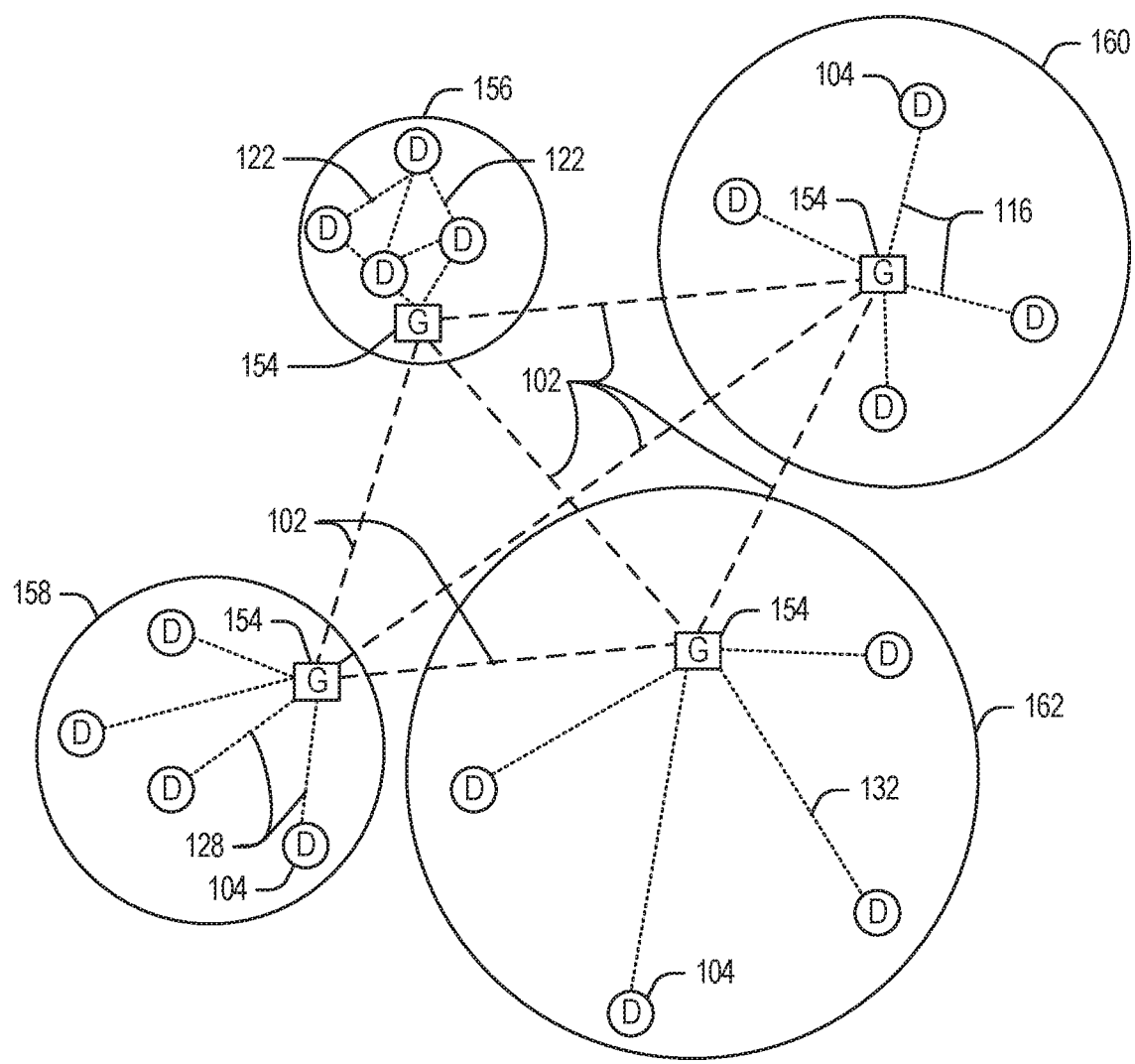
FIG. 1 illustrates art domain topology for respective internet-of-things ((IoT) networks coupled through links to respective gateways, according to an example.

DETAILED DESCRIPTION in the following description, methods, configurations, and related apparatuses are disclosed for the processing of security contexts in an IoT device interconnection setting through the use of distributed access control data processing. In an example, the present techniques allow the definition of a rich object and subject context for features of an object model, which may be used as a bridging technique to map access among subjects and objects that do not have matching security contexts. This bridging may be used in discrete object model features such as applications, device types, device states, resource types, resources, and properties. As also discussed herein, techniques may be used to apply a data mapping function for determining access control characteristics across object models that are otherwise semantically disjoint.

IoT systems are a network of distributed data producers and consumers. IoT frameworks (e.g., Open Connectivity Foundation (OCC), Open Mobile Alliance (OMA), OMA Lightweight MFM (LWM2M), OneM2M, Alljoyn, and the like) define respective object models for use in such frameworks. An object model is data definition abstraction that is accompanied by a data definition language. However, access control defined in an object model may not fully comprehend object scope. For example, some objects and features defined by the object model may be excluded from access control. This may result in gaps in access enforcement.

Interoperability among devices in existing IoT networks is often is often achieved using a bridging device (e.g., a gateway) that manually maps one IoT object model to another. However, gaps in the access model results in imperfect mapping logic that may lead to privilege escalations (erroring on the side of interoperability) or loss of function (erroring on the side of security). Further, security issues may arise in scenarios that bridge an access policy expressed as an access control list (ACL) with an access policy expressed as a capability list. This mapping between an ACL and a capability list presents a challenge for handling implicit objects to which ACLs apply, such as objects that are not expressly defined by the object model. Likewise, this challenge is also present when processing capability lists, when the subjects to which the capability applies are not defined by the object model. As a result, with existing techniques, bridging actions often will inject substitution logic that replaces one subject for another and one object for another. This substitution logic may lead to undesirable privilege escalations. As discussed in the following techniques, bridging actions may be adapted to apply principles of "least-privilege" and "least-data" to IoT object models, with use of a rich object model context so that semantically equivalent object and subject matching may be made, without undue loss of function.

The techniques discussed herein include scoping context for IoT subjects and objects, through a technique that identifies a least-common match (applying a principle of least-privilege) when subjects and objects differ in scope. Such scoping may be used in an IoT communication environment that may be characterized as machine-to-machine interaction. Unlike human-to-machine interactions that may have asymmetry in terms of subject and object scoping, machine-to-machine interactions may be characterized in a model that applies symmetric scoping.

FIG. 1 illustrates an example domain topology for respective internet-of-things (IoT) networks coupled through links to respective gateways. The Internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. An IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
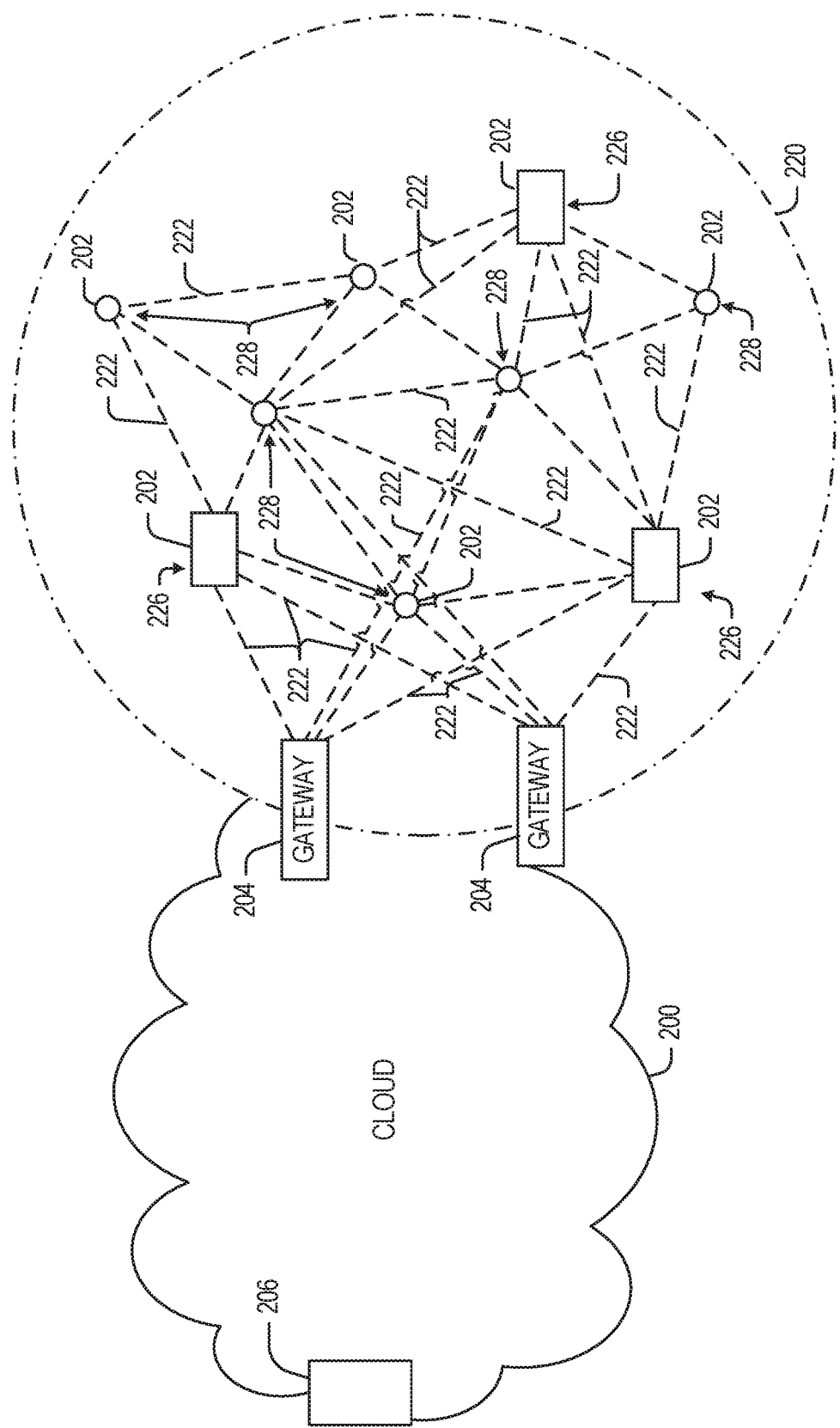
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, presents a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (40) or 50 cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and Internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements and traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may, provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of MT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the hack end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting IoT devices 202, such as particular sensors 228, needed to answer the query. The data from these sensors 2:28 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

As previously discussed, communications among IoT devices and within IoT networks (including in the scenarios depicted above for FIGS. 1 and 2) include a number of access control and security considerations. These considerations are particularly acute in an IoT communication framework involving multiple types of communication standards and protocols, where access control parameters are not expressly pre-defined. Many IoT communication frameworks include object models, and define objects as a way to represent data. Accordingly, access control is applied at the data layer, but security violations may occur as a result of incorrectly mapped data structures. Gaps in the access model results in imperfect mapping logic that may lead to privilege escalations (erroring on the side of interoperability) or loss of function (erroring on the side of security).

Current approaches to access control and the security of objects in existing IoT communication frameworks include the use of capability lists and ACLs. ACLs are a policy that is affixed to objects (e.g., destinations) and that define subjects (e.g., sources) and access rights of those particular subjects, whereas capability lists are affixed to subjects and define the objects and access rights to those particular objects. These approaches bind the access policy to either the subject or object, making it difficult for access evaluation to match subject and object scoping. Bridging an access policy expressed as an ACL with one expressed as a capability list presents a significant challenge when ACLs apply to implicit objects (i.e., are not defined by the object model). Likewise, for capability lists the subjects to which the capability applies are often not defined by the object model. As a result, the bridging function must inject substitution logic that replaces one subject for another and one object for another. This substitution logic may lead to undesirable privilege escalations (and in some examples loss of functionality).

The present techniques, further discussed below, decouple access policy from respective subjects and objects so there are no implicit bindings. Instead, as discussed herein, a policy object may be adapted to provide for explicit matching of both subjects and objects. The present techniques provide flexibility for access to be evaluated at multiple points of enforcement (such as by a bridge or gateway, at the point of origin or at the point of destination). Further, with the present techniques, access and security considerations may be evaluated at the most appropriate scope for the given enforcement point.

Existing approaches to enforce access control between dissimilar networks and objects often rely on statically defined policy mapping that anticipates possible mapping incongruences and tries to resolve them a priori (for example in the context of a standards or industry group). The presently described techniques allow a binding function to dynamically resolve to a best mapping, without a priori consideration of the mapping combinatorics.

Figure 3:
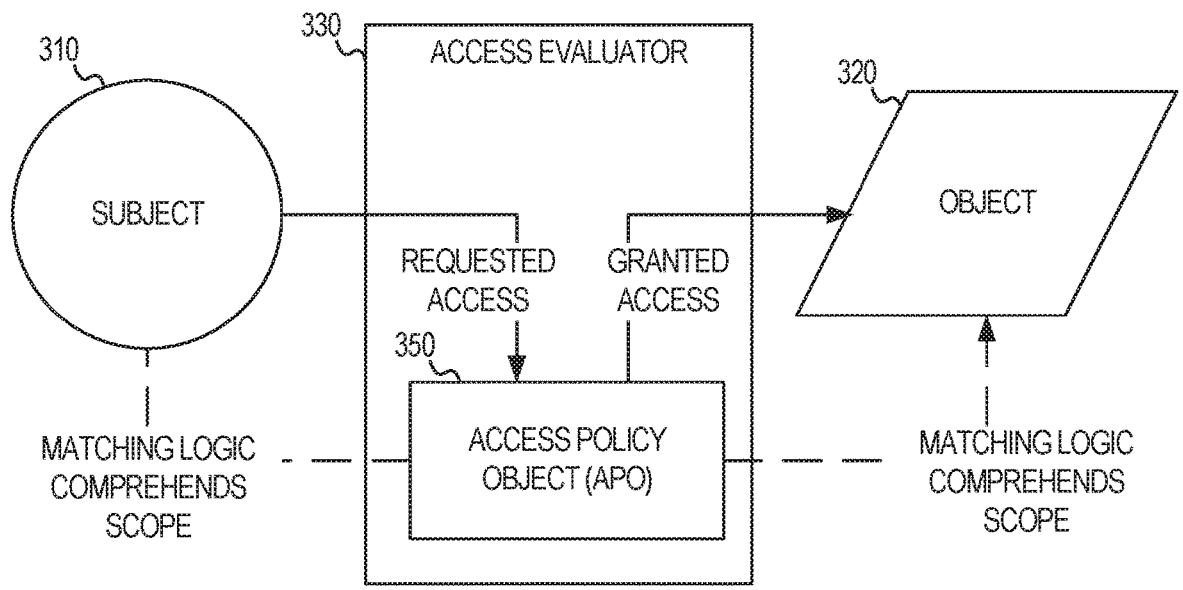
FIG. 3 illustrates a block diagram of access control operations performed between a subject and an object with use of an access evaluator, according to an example.

FIG. 3 illustrates a block diagram of example access control operations performed between a subject 310 and an object 320 with use of an access evaluator 330, according to an example implementation of the present techniques. As shown, the subject 310 may request access to some object 320 through the use of an access evaluator 330; the access evaluator 330 then grants (or denies) access for the subject to access the object 320.

In an example, a rich object and subject context are defined in a bridging method, to allow application of a mapping function (and mapping logic) between access policies that otherwise are semantically disjoint. In the example of FIG. 3, the access evaluator 330 intermediates and evaluates IoT subject(s) requesting access to IoT object(s). The access evaluator 330 grants (or denies) access based on the access policy object 350. In a further example, the access policy object 350 provides a matching scoping context, such that it is reasonable for the access evaluator 330 to apply a least-privilege algorithm that seeks to align the scoping context of both subject 310 and object 320. This scope alignment minimizes potential for privilege escalation through bridges, gateways or endpoints (and anywhere access is enforced).

Also in a further example, a similar granularity scope may be determined for both subject 310 and object 320 where the narrowest scope defines the least-privilege context. In an example technique, further discussed below, a "least-scope" is applied to a bridging function to automate access control evaluation and enforcement at a network boundary.

Figure 4:
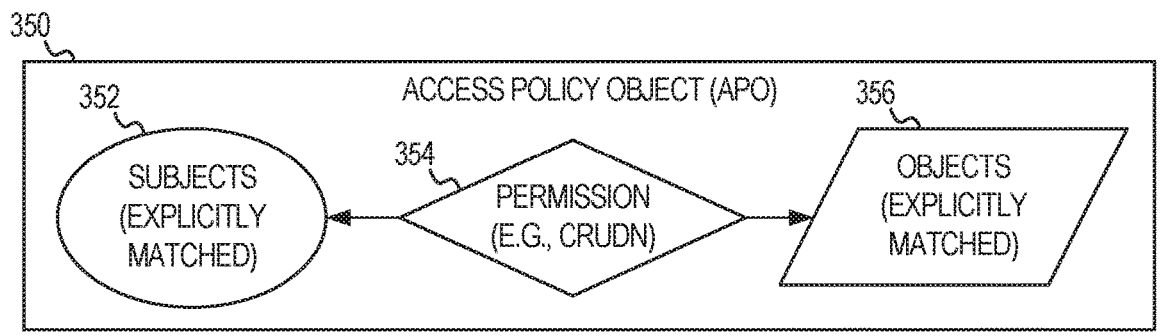
FIG. 4 illustrates a configuration of an access policy object, according to an example.

FIG. 4 illustrates a configuration of an example access policy object 350. The access policy object 350 is used to inform the access evaluator 330 with references that explicitly match both subject(s) 352 and object(s) 356.

In an example, matching is performed before a permission 354 is applied. The permission 354 informs the access evaluator 330 regarding how best to filter, throttle, or control interactions between the subject(s) 352 and the objects 356. In an example, the permission 354 may relate to one or more of Create, Retrieve, Update, Delete and Notify (CRUDN) operations. CRUDN, however, is merely provided as an example, and it is expected that any allowed transformation over objects could be named by the permission.

While the scoping may be symmetric, the mapping between different access policies may not be. In other words, "least-privileges" may differ in mapping requests from A→B than from B→A. For instance, A may have greater privilege in B's domain, than vice versa, due to greater specificity (smaller granularity) in domain A. As an illustration, if A's domain defines five levels of robustness 1-5, and B defines three levels of robustness 1-3, device 1A may qualify as level 4 in domain A, but level 2 in domain B. Whereas device 1B may qualify as level 2 in domain B, but qualify as level 3 in domain A due to insufficient granularity of measurement in domain B. Therefore, the mapping may imply an asymmetry of scope. Such cases are detectable with the present techniques and may be resolved through semantic equivalence models or other exception handling methods including manual review.

Figure 5:
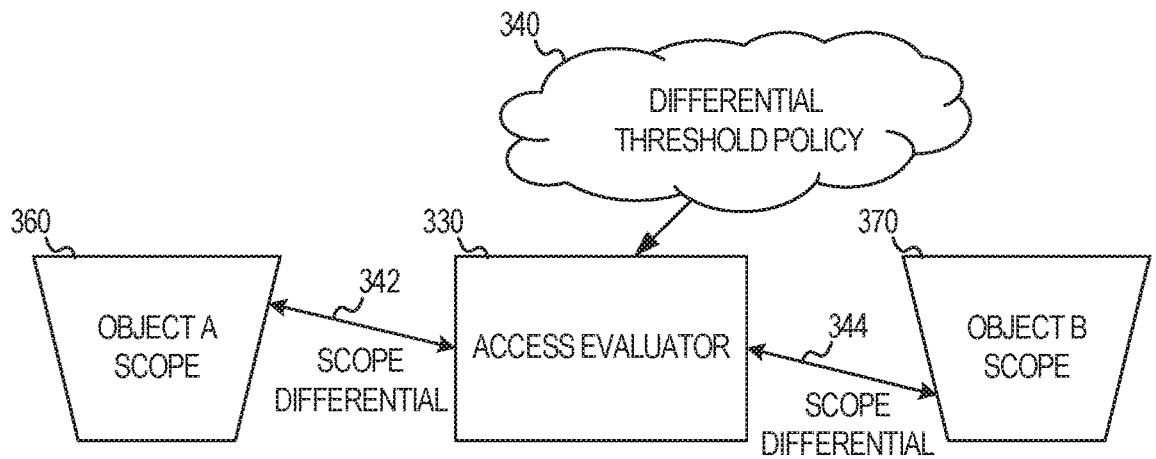
FIG. 5 illustrates a block diagram of access control operations enabled by an access evaluator for respective objects, according to an example.

FIG. 5 illustrates a block diagram of example access control operations enabled by an access evaluator for respective objects. In the example of FIG. 5, the access evaluator 330 uses scoping context to evaluate potential for privilege escalation. A policy service provider (e.g., operating as the access evaluator 330) may control evaluation based on a differential threshold policy 340 that considers risk associated with privilege escalations. For example, a scope of a first object 360 may have a first scope differential 342 as detected by the access evaluator 330; this differential 342 may differ from a second scope differential 344 to the scope of a second object 3'70. The access evaluator 330 may operate to detect the scope dissimilarity and apply the differential threshold policy 340 to reconcile these differences.

The access evaluator 330 may be used to find the least-privilege access path at similar scope and apply the access permissions defined for that scope. If there is scoping dissimilarity: A) a domain specific policy may inform regarding whether requests with dissimilar scope are denied;

B) a domain specific policy may determine whether access should escalate to more coarse scope for evaluation; or C) a domain specific policy may determine whether access should be permitted across dissimilar scoping, but where a domain policy informs regarding a threshold of acceptable range of differential (for example, if an access request crosses three scoping levels but not four scoping levels, then access is evaluated).

Current approaches (e.g., capability lists ACLs) bind the access policy to either the subject or object making it difficult for access evaluation to match subject and object scoping. The present techniques decouple access policy from subjects and objects so there are no implicit bindings. Instead, the policy object contains provisions for explicit matching of both subjects and objects. This provides flexibility for access to be evaluated at multiple points of enforcement (such as by a bridge or gateway, at the point of origin or at the point of destination). Access may be evaluated at the most appropriate scope for the given enforcement point.

Returning to the example of FIG. 5, the access evaluator 330 may operate to apply the most appropriate permission, even in scenarios with multiple access policy objects that could be satisfied by the matching criteria. For example, the subject may authenticate with a credential that authorizes any machine from a sub-group to interact with any other machine in the same sub-group. However, given a safety critical function that closes all the doors in a burning building should not permit door closure under normal working conditions (which could result in business continuity interruption). To address this scenario, a series of hierarchy of contexts may be considered and used. In an example, a hierarchy of contexts may be provided from an IoT communication architecture.

Figure 6:
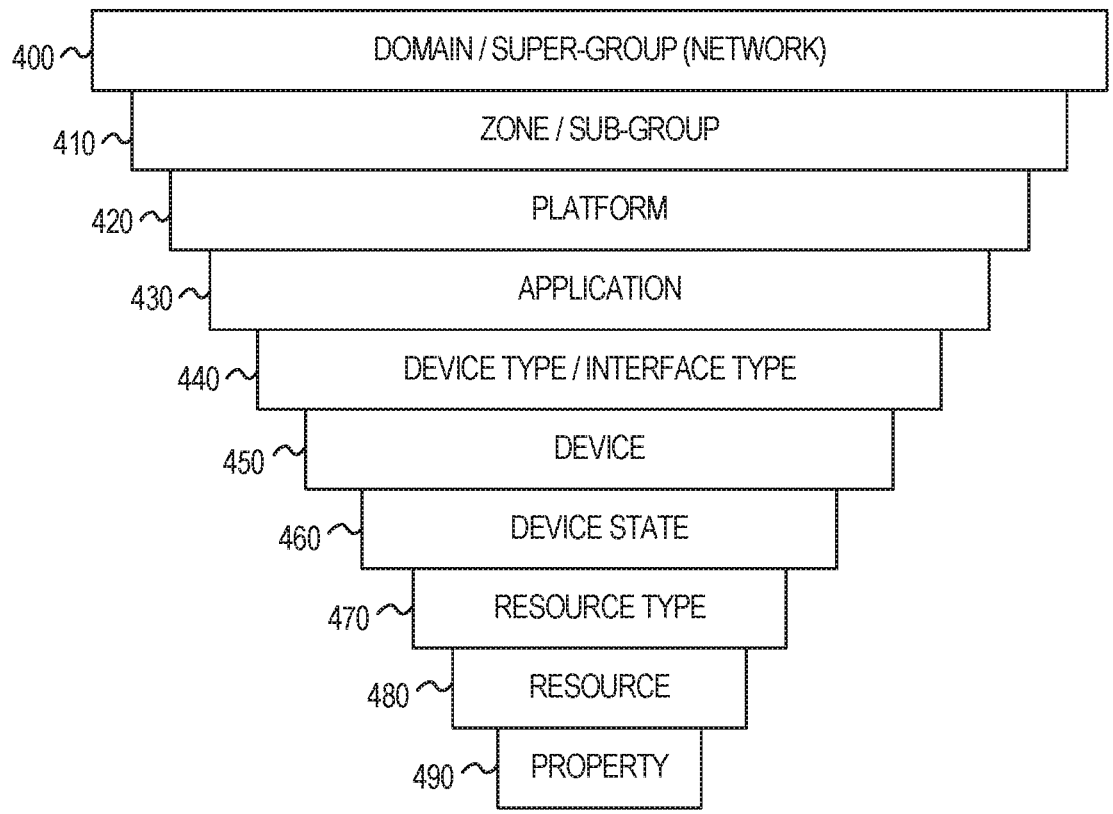
FIG. 6 illustrates a hierarchy of contexts for IoT data elements used among respective IoT devices, according to an example.

FIG. 6 illustrates an example hierarchy of contexts for IoT data elements used among respective IoT devices. The references to "scope" (such as referred to in FIG. 5) refers to the hierarchy of context where IoT elements may be identified/named and interactions between elements may be stereotyped.

As shown in FIG. 6, a hierarchy is defined that includes a domain or supergroup 400, above a zone or sub-group 410, above a platform 420, above an application 430, above a device type or interface type 440, above a device 450, above a device state 460, above a resource type 470, above a resource 480, above a property 490.

The IoT object model is expressed using a data model language (DML) such as JSON schema, XML schema, YANG, or the like. This data model (typically) defines how elements in the object model are named and referenced. In an example, the access policy management techniques discussed herein obtain access evaluation scope semantics from the data model and define the hierarchical relationship to a hierarchy such as is depicted in FIG. 6.

IoT interactions may be described in terms of the Subject (the requestor) scope as well as in terms of the Object (the responder) scope. Because IoT interactions are machine-to-machine, and both requestor and responder may be described using the DML, both requestor and responder may be provided with object scoping. Interactions that occur at similar scope are naturally type enforced. Explicit specification of which subject scope element is authorized to interact with which object scope element, results in a type enforcement policy. As a result, the access policy object defines a type enforcement policy.

Figure 7:
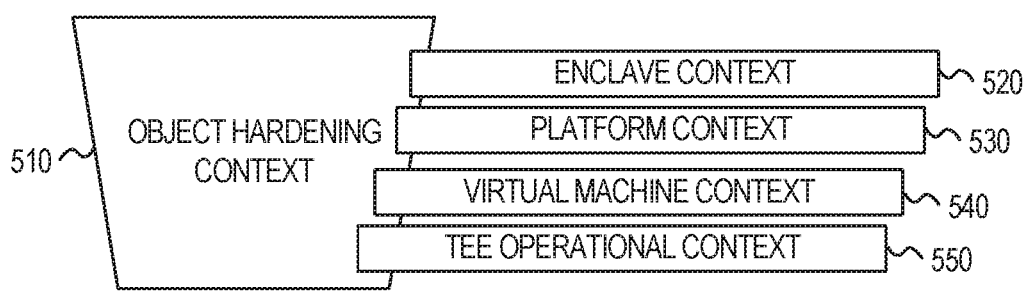
FIG. 7 illustrates a hierarchy of contexts for trusted environments used to implement security hardening, according to an example.

In a further example, the access evaluator 330 authenticates subjects with secure computational facilities to establish a scoping context. This may use hardening techniques that employ a hierarchy of trusted execution environments (TEE) and attestation within a device. FIG. 7 illustrates an example hierarchy of contexts for trusted environments used to implement security hardening. Specifically FIG. 7 shows TEE context aligned with IoT object scope, with a hierarchy of contexts (enclave context 5:20, ranked over a platform context 530, ranked over a virtual machine context 540, ranked over a TEE context 550) being tied to the object hardening context 510.

Different layers of the scope hierarchy may be protected by different TEE contexts. FIG. 7 shows one possible configuration of a TEE where at least a platform TEE context 530 hardens a platform (such as with use of trusted platform module (TPM) and Secure Boot mechanisms) while an Enclave TEE context 520 hardens a collection of platforms (such as with use of a Network Access Control (NAC) router that isolates platforms behind a firewall). Additional hardening may be provided by a virtual machine context 540 and a. TEE operational context 550. A variety of TEE technologies may be used to construct the object hardening among the contexts 520, 530, 540, and 550, including but not limited to: Intel TxT, Intel SGX, Intel VT-x, Intel VT-d, Intel CSME, Intel TrustLite, SE Linux, Docker Containers and ARM TrustZone, and the like.

In a further example, the access evaluator also establishes a secure path according to the scoping of the responder's object hierarchy. This secure path may use the same mechanisms described herein for secure connection to the subject. This approach ensures the access evaluator makes semantically rich security decisions that may be applied consistently regardless of where enforcement is applied and whether enforcement is applied at multiple points on an end-to-end path between requestor and responder. This may provide an important benefit because IoT networks often consist of multiple ad hoc networks connected in an arbitrary fashion.

Existing approaches for evaluating access in a homogeneous network embed access processing logic (e.g., static logic) in the device hosting the resource where the requester decides the granularity of access evaluation when the requester selects an authentication credential. The requester may select a credential that has coarse or fine granularity— that essentially allows the caller to manipulate granularity regardless of machine-to-machine context. Further, with existing approaches, the resource host may have multiple ACL policies that match at different granularity. Typically, the resource host computes the UNION of privileges (error on the side of allowing access) rationalized by the fact that the requester could assert access at whatever granularity the ACL policy is written—since the requester is free to decide its scope of access.

With the techniques discussed herein, a domain policy may control the degree of dissimilarity of access scope for machine-to-machine interactions. This provides the advantage for devices supporting a range of critical functions (e.g., critical, semi-critical, noncritical) may be assured that the most appropriate access controls, those suited to the criticality, are applied. As a non-limiting example, a medical device that reports an emergency health event may require UPDATE access to a communications device (e.g., phone) when in the emergency mode, but otherwise would not be given UPDATE access to prevent violation of health information privacy regulations.

Figure 8:
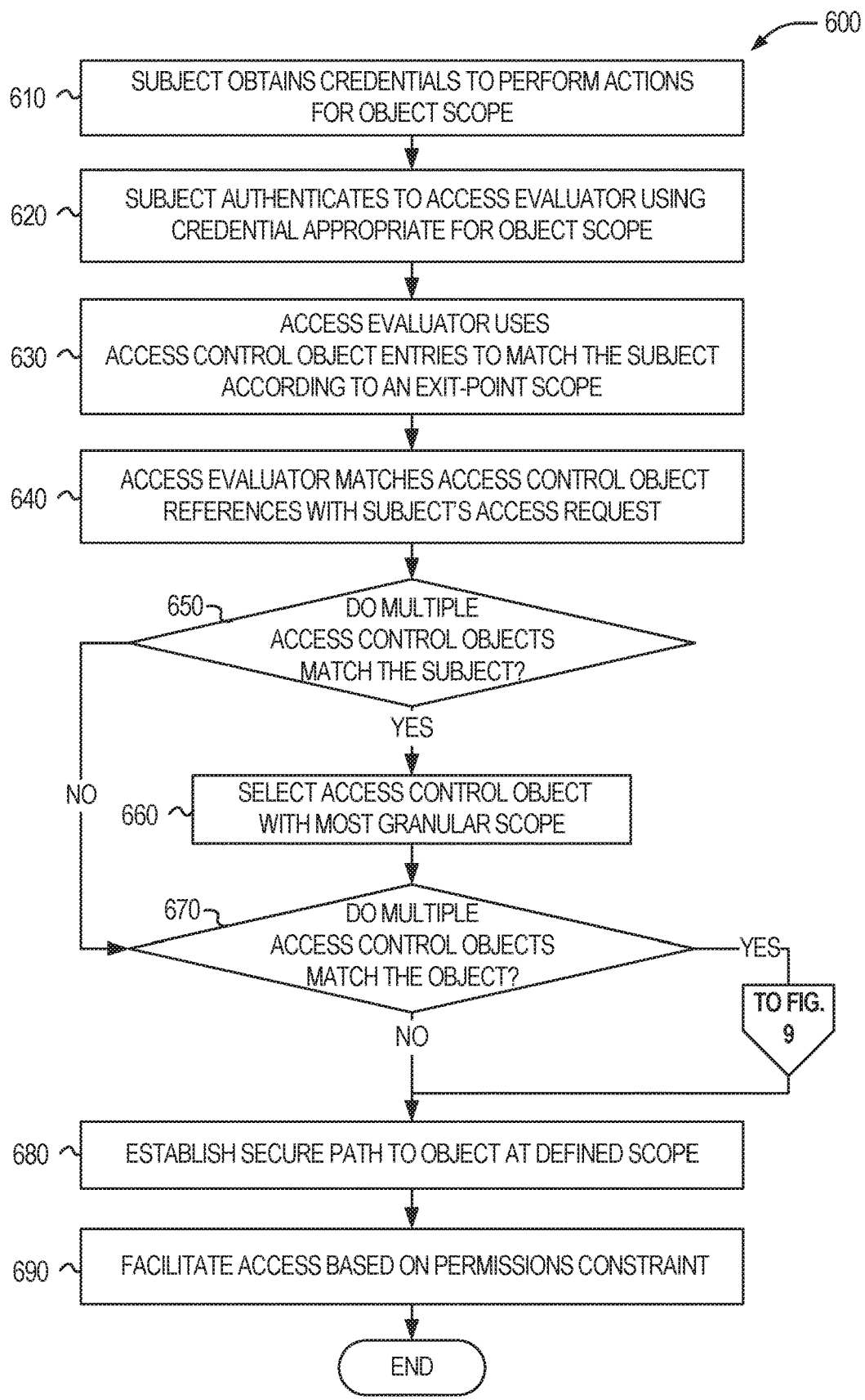
FIG. 8 illustrates a flowchart of operations for implementing an access control method with object scope alignment, according to an example.

FIG. 8 illustrates a flowchart 600 of example operations for implementing an access control method with object scope alignment. As illustrated in the following operations of the flowchart 600, the operations ensure the access permission granted is the most appropriate. This may, for example, ensure that the most granular context selects the most appropriate Access Control Object (ACO) to apply and realizes both type enforcement and access authorization objectives.

As shown, the flowchart 600 first includes operations for a subject obtaining credentials to perform one or more actions for an object scope (operation 610). The subject then authenticates to an access evaluator using a credential appropriate for the object scope (operation 620). The access evaluator uses one or more access control object entries to match the object, according to an exit-point scope (e.g., a scope of the destination for the requested action(s)) (operation 630). For example, as suggested above, interactions may be described in terms of the Subject (requester) scope as well as in terms of the Object (responder) scope. Interactions that occur at similar scope are naturally type enforced. This is in addition to an explicit specification of which subject scope element is authorized to interact with which object scope element, that results in a type enforcement policy.

The operations of the flowchart 600 continue with the access evaluator matching the access control object references with a subject's access request (operation 640). The operations that are performed are then further dependent on whether multiple access control objects match the subject and the object. In the example where multiple access control objects match the subject (evaluation 650), then an access control object with a most granular scope is selected (operation 660). This continues to a determination of multiple matches to the object (evaluation 670). If multiple access control objects match the object, then further processing is performed as explained below with reference to FIG. 9.

Finally, as a result of the identified access control object, a secure path may be established to the object at a defined scope of the identified access control object (operation 680), and access may be facilitated based on a permissions constraint of the identified access control object (operation 690). This secure path may occur in connection with the use of hardening techniques as discussed above.

Figure 9:
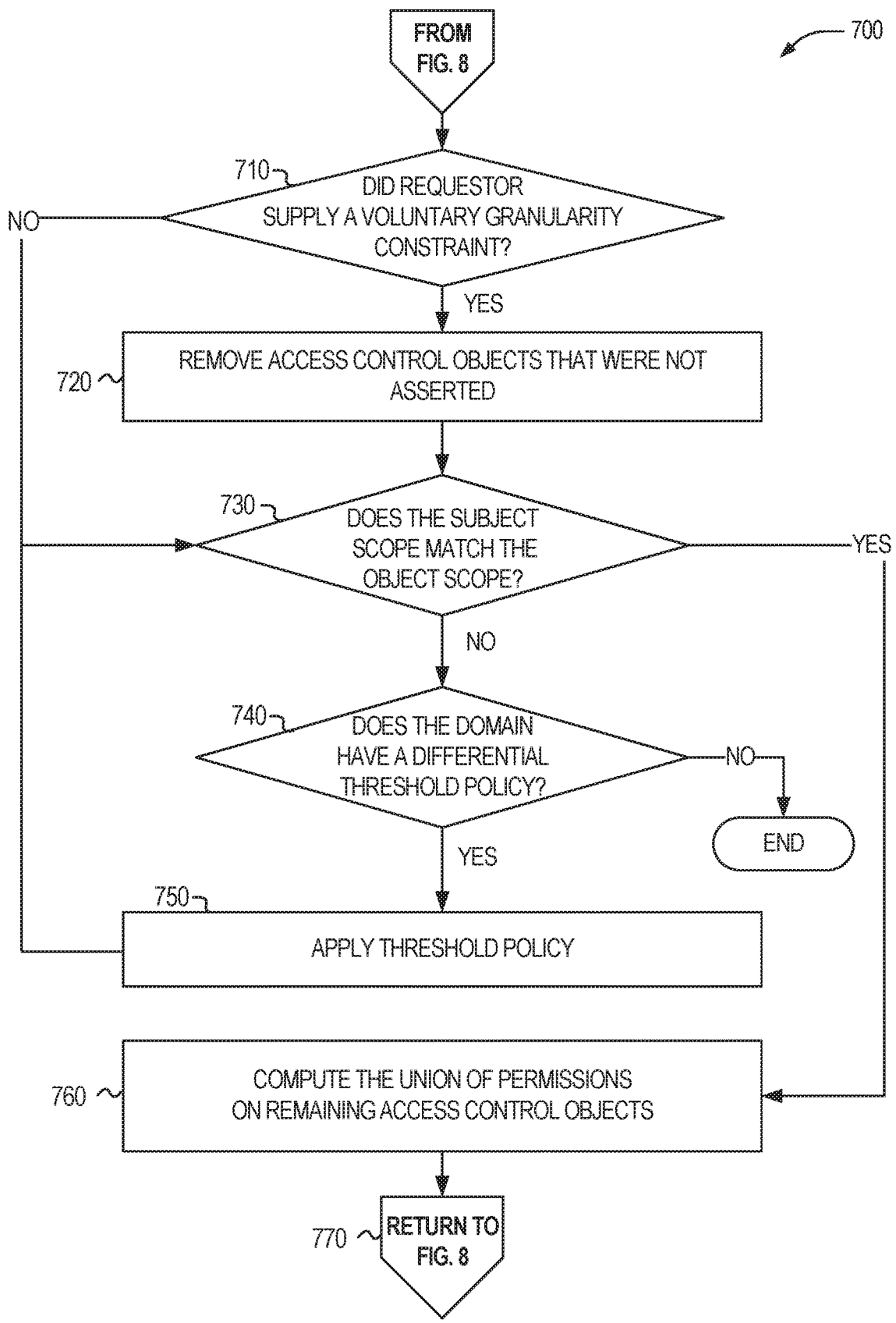
FIG. 9 illustrates a flowchart of further operations for implementing an access control method with object scope alignment, with use of multiple access control objects, according to an example.

FIG. 9 illustrates a flowchart 700 of further operations for implementing an access control method with object scope alignment, with use of multiple access control objects. As suggested above, the operations of the flowchart 700 may be performed when multiple access control objects match the object (as indicated in evaluation 670 of FIG. 8).

The flowchart 700 includes additional evaluations of characteristics, to identify which object or features access control object of the multiple access control objects should be recognized. In the case that a subject (requestor) supplies a voluntary granularity constraint (decision 710), then access control objects that were not asserted may be removed from consideration (operation 720).

In the case that the subject scope matches the object scope (evaluation 730), then the evaluation of the flowchart 700 may conclude, with the computation of the union of permissions on remaining access control objects (operation 760) and the continuing of the evaluation as depicted in FIG. 8 (operation 770). In the case that the subject scope does not match the object scope (evaluation 730), then a further determination is performed of whether the domain has a differential threshold policy (evaluation 740). If the domain includes a differential threshold policy, then the threshold policy is applied (operation 750), and operations are repeated to determine whether the subject scope matches the object scope (evaluation 730). If the domain does not include a differential threshold policy, then the operations may terminate.

Figure 10:
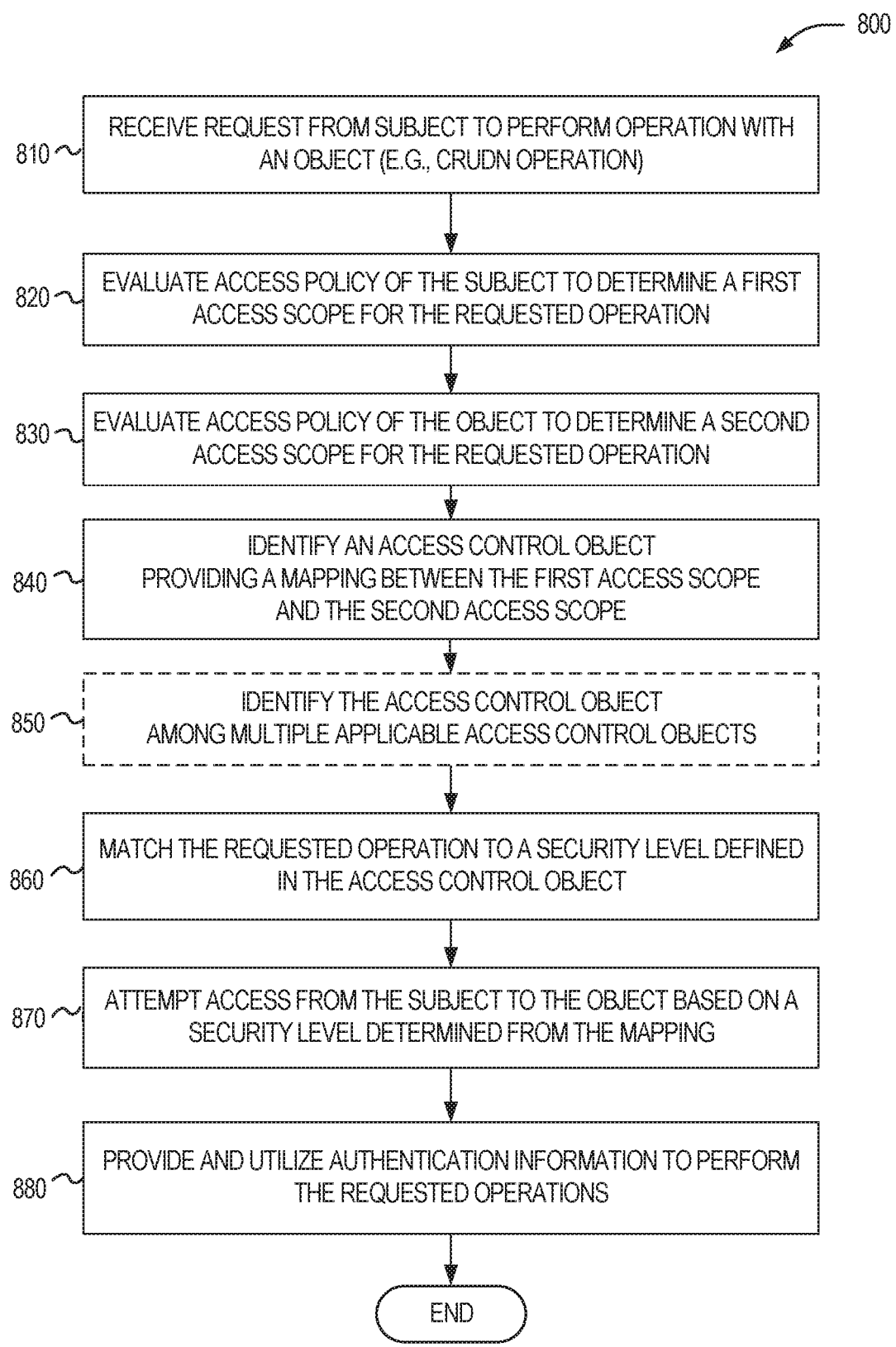
FIG. 10 is a flowchart illustrating a method of managing access control information in an IoT device deployment, according to an example.

FIG. 10 illustrates a flowchart 800 illustrating an example method of managing access control information in an IoT device deployment. The following operations of the flowchart 800 may be conducted by an electronic processing system (including a specialized computing device) adapted to determine an access control policy in accordance with any of the techniques discussed herein. It will be understood that the operations of the flowchart 800 may also be performed by other forms and types of devices, with the sequence and type of operations of the flowchart 800 potentially modified based on the other examples of access control and access evaluation as indicated above.

The operations of the flowchart 800 depict a typical scenario performed by the access evaluator for the identification of an access policy, including: receiving a request from a subject to perform an operation with an object (operation 810), such as a Create, Retrieve, Update, Delete or Notify (CRI DN) operation. In an example, the subject operates in accordance with a first type of access policy, and the object operates in accordance with a second type of access policy. In a further example, the first type of access policy provides a different number of security levels than the second type of access policy. Also in a further example, the subject and the object represent different types of: a domain, a zone, a platform, an application, a device type, an interface type, a device, a device state, a resource type, a resource, or a property.

The operations of the flowchart 800 continue to evaluate the first type of access policy of the subject to determine a first access scope with regard to performing the requested operation (operation 820) and evaluate the second type of access policy of the object to determine a second access scope with regard to performing the requested operation (operation 830). Based on this first access scope and the second access scope, an appropriate access control object may be identified that provides a mapping between the respective scopes (operation 840). In an example, the access control object provides an express matching of the subject to the object based on a permission to perform the requested operation. Also in an example, the access control object provides a mapping of the first access scope to the second access scope at a lower privilege level.

In a further example, the access control object is identified from among a plurality of access control objects (operation 850). Also in a further example, in response to multiple access control objects matching the subject, a particular access control object of the multiple access control objects having a most granular scope to perform the requested operation is selected (operation 860). Also in a further example, in response to multiple access control objects matching the object, an access control object of the multiple access control objects is selected based on the identification and removal of access control objects (such as is discussed above with reference to FIG. 9).

In accordance with the techniques discussed herein, the requested operation (e.g., a CRUDN operation) is matched to a security level defined in the identified access control object (operation 860). Based on this security level, access from the subject to the object is attempted, based on the security level determined from the mapping of scopes provided in the access control object (operation 870). For example, this security level may involve the subject providing and the object utilizing particular authentication information (including authentication information from a trusted execution environment) to perform the requested operation (operation 880).

Various examples provided herein of access control between a subject and an object refer to operations between a first respective IoT device and a second respective IoT device, each being separate logical devices. However, it will be understood, that in further examples, more than one device may collaborate to provide a common logical device, or platform of a logical device, such that multiple of such logical devices or platforms can be jointly onboarded, controllable, and interacted with, within a network framework infrastructure.

Figure 11:
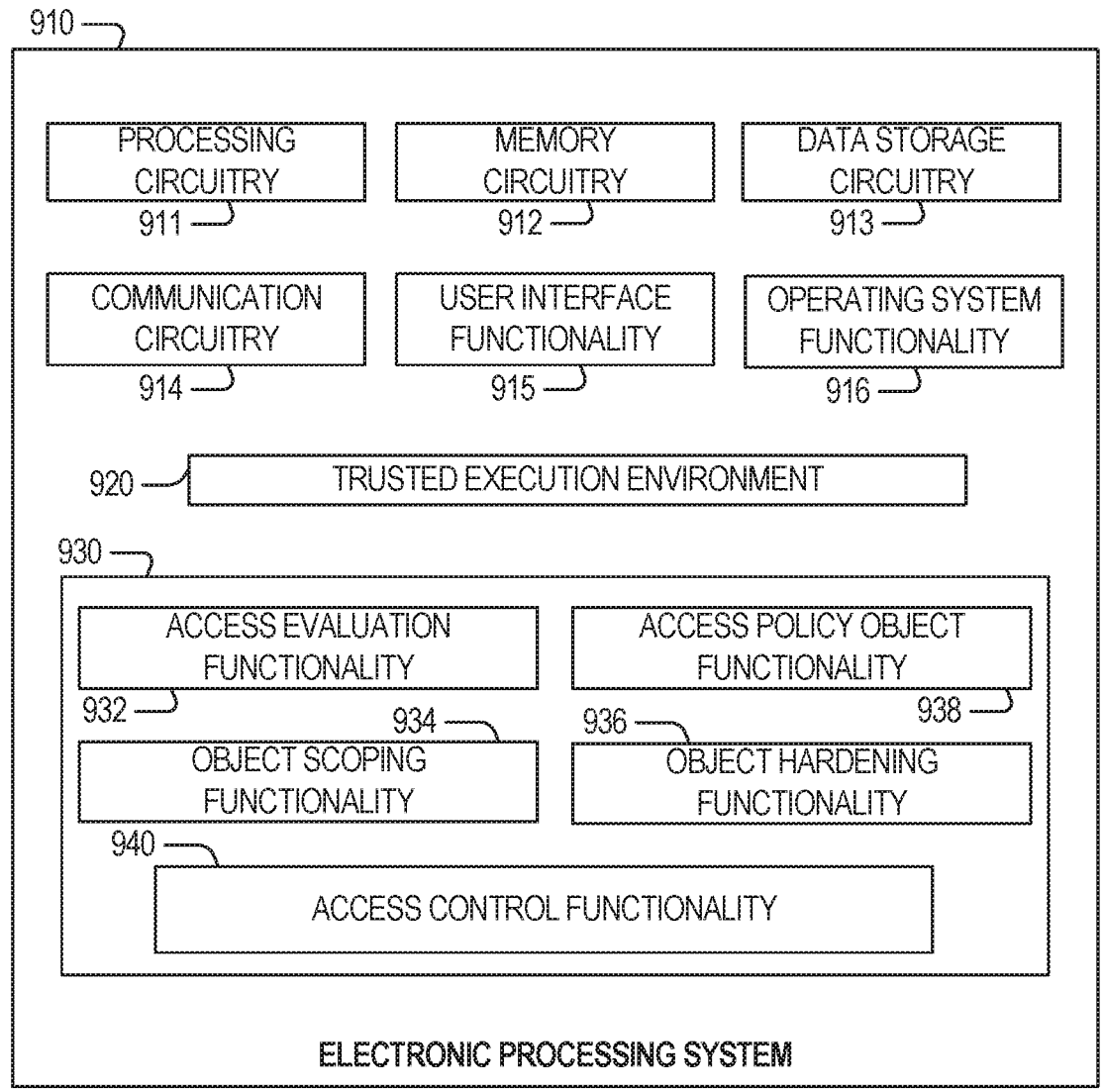
FIG. 11 illustrates a block diagram of components in an example system configuration for managing access control information in an IoT device, according to an example.

FIG. 11 illustrates a block diagram of components in an example system configuration for managing access control information in an IoT device. As shown, the block diagram depicts an electronic processing system 910 such as may be embodied by an IoT device provided in the form of a computing or other electronic processing device. The electronic processing system 910 includes circuitry (described below) operably coupled to a trusted execution environment 920 and an access control environment 930, for instance from the operation of the trusted execution environment 920 and access control environment 930 as software-configured circuitry.

The circuitry of the electronic processing system 910 is depicted as including: processing circuitry 911 (e.g., a CPU) and memory circuitry 912 (e.g., volatile or non-volatile memory) used to control and process electronic operations of the system, including access control operations discussed herein; data storage circuitry 913 to store access control information, authentication data, and control instructions for operation of the electronic processing system 910; communications circuitry 914 to communicate (e.g., wired or wirelessly) with an external network or devices; user interface functionality 915 (e.g., a display unit or display features implemented with the processing circuitry 911 and memory circuitry 912) to implement a user interface, e.g., to output a display with a user interface hardware device; and operating system functionality 916 (e.g., features implemented with the processing circuitry 911 and memory circuitry 912) to implement system control and operational features, including use of the access control functionality discussed herein.

The trusted execution environment 920 is depicted in the electronic processing system 910 and may include any number of features including a trusted platform module (TPM), a Secure Boot mechanism, a secure enclave, or a virtual machine instance. For example, the trusted execution environment 920 may operate in connection with the access control environment 930 to facilitate the exchange of secure credentials and information, the execution of trusted software instructions, or access to trusted and secure data.

The access control environment 930 is depicted as including access evaluation functionality 932, object scoping functionality 934, object hardening functionality 936, and access policy object functionality 938. In an example, the access control functionality 940 may be provided from specialized hardware operating independent from the processing circuitry 911 and the memory circuitry 912; in other examples, the access control functionality 940 may be software-configured hardware that is implemented with use of the processing circuitry 911 and the memory circuitry 912 (e.g., by instructions executed by the processing circuitry 911 and the memory circuitry 912). The access evaluation functionality 932, for example, may operate in connection with the access evaluation features discussed above with reference to FIG. 3. The object scoping functionality 934, for example, may operate in connection with the object scoping features discussed above with reference to FIGS. 5 and 6. The object hardening functionality 936, for example, may operate in connection with the object hardening features discussed above with reference to FIG. 7. The access policy object functionality 938, for example, may operate in connection with the access policy object features discussed above with reference to FIG. 4. The access control functionality 940 and the electronic processing system 910 may also include other components, not depicted, for implementation of other forms of authentication and user interaction operations. Further, the operation of the access control environment 930 may be further affected by other inputs and outputs, including those received with input control components (e.g., buttons, touchscreen input, external peripheral devices), and those provided by output components (e.g., a touchscreen display screen, video or audio output, etc.).

In further examples, the operations and functionality described above with reference to FIGS. 3 to 11 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 12:
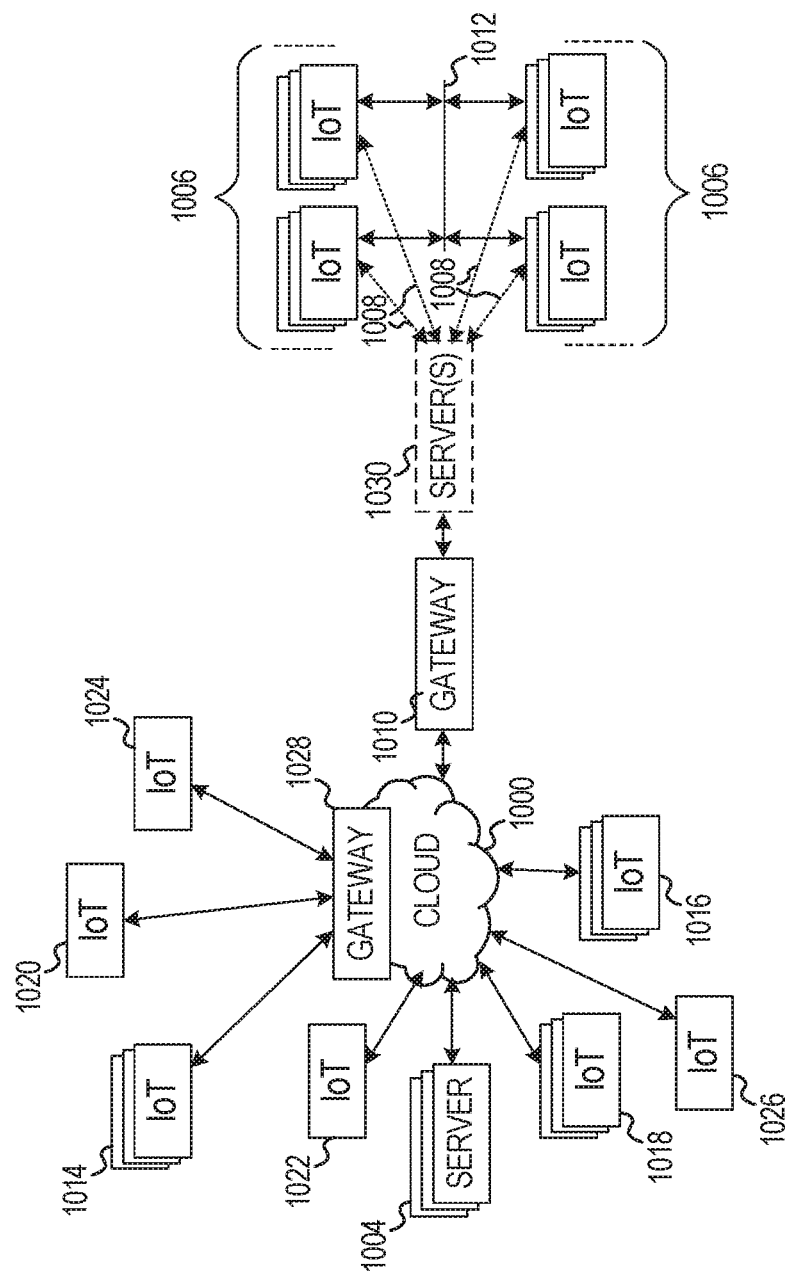
FIG. 12 illustrates a block diagram of a network illustrating communications among a number of IoT devices, according to an example.

FIG. 12 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 2), or a combination therein. The groups of IoT devices may be deployed in various residential, commercial, industrial, settings (including both private or public settings).

As may be seen from FIG. 12, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad hoc network between the devices, allowing them to function as a single device, which may be termed a fog device or system (e.g., as described above with reference to FIG. 2).

Figure 13:
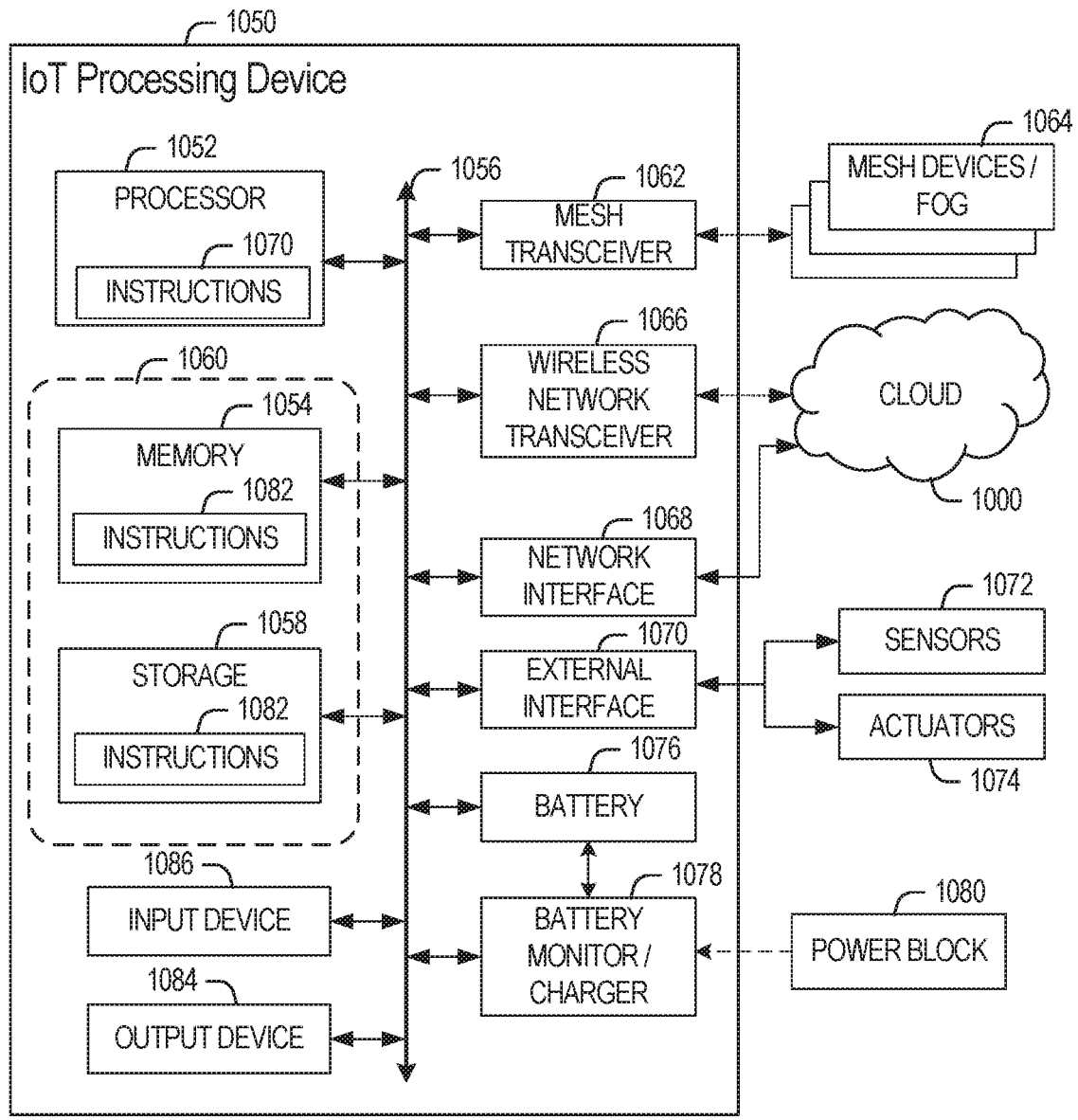
FIG. 13 illustrates a block diagram for an example IoT processing system architecture upon which any one or more of the techniques (e.g., operations, processes, methods, and methodologies) discussed herein may be performed, according to an example.

FIG. 13 is a block diagram of an example of components that may be present in an IoT processing device 1050 for implementing the techniques described herein. The MT device 1050 may include any combinations of the components shown in the example or referenced in the disclosure above. The components may be implemented as integrated circuits (ICs), portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 13 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, of Santa Clara, Calif. (CA). However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an 12C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BILE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee® or other intermediate power radios. Both communications techniques may take place over a single radio at different power levels, or may take place over separate transceivers, for example, a local transceiver using BLE and a separate mesh transceiver using ZigBee®.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NEC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 13 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart of operations in FIGS. 8 to 10.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device adapted for determining an access control policy, the device comprising processing circuitry to: receive a request from a subject to perform an operation with an object, the subject operating in accordance with a first type of access policy, and the object operating in accordance with a second type of access policy; evaluate the first type of access policy of the subject to determine a first access scope with regard to performing the requested operation; evaluate the second type of access policy of the object to determine a second access scope with regard to performing the requested operation; identify an access control object that provides a mapping between the first access scope and the second access scope for the requested operation; and provide access from the subject to the object based on a security level determined from the mapping between the first access scope and the second access scope provided by the access control object.

In Example 2, the subject matter of Example 1 optionally includes the first and second types of access policies being distinct and incompatible, wherein the first type of access policy provides a different number of security levels than the second type of access policy, and wherein the access control object maps the first access scope to the second access scope at a lower privilege level.

In Example 3, the subject matter of any one or more of Examples 1-2 optionally include the processing circuitry further to identify the access control object from among a plurality of access control objects.

In Example 4, the subject matter of any one or more of Examples 1-3 optionally include the subject and the object representing different types of: a domain, a zone, a platform, an application, a device type, an interface type, a device, a device state, a resource type, a resource, or a property, and wherein the access control object provides an express matching of the subject to the object based on a permission to perform the requested operation.

In Example 5, the subject matter of Example 4 optionally includes the requested operation being a Create, Retrieve, Update, Delete or Notify (CRUDN) operation.

In Example 6, the subject matter of any one or more of Examples 1-5 optionally include operations that identify the access control object including operations that match the requested operation to a security level defined in the access control object, based on an exit-point scope of the access control object to perform the requested operation.

In Example 7, the subject matter of any one or more of Examples 1-6 optionally include operations that in response to multiple access control objects matching the subject, select a particular access control object of the multiple access control objects having a more granular scope to perform the requested operation.

In Example 8, the subject matter of Example 7 optionally includes operations that in response to multiple access control objects matching the object, select an access control object of the multiple access control objects by: removing access control objects from among the multiple access control objects that are not asserted with a voluntary granularity constraint; and matching a scope of the request from the subject to a scope of a permission to perform the requested operation in remaining multiple access control objects; and computing a union of permissions on the remaining multiple access control objects.

In Example 9, the subject matter of any one or more of Examples 1-8 optionally include the processing circuitry further to: receive and utilize authentication information from the subject to perform the requested operation with the object, the authentication information for the object including credentials.

In Example 10, the subject matter of Example 9 optionally includes the credentials being used to authorize a trusted execution environment to perform actions appropriate for an object scope that is under control of the trusted execution environment.

In Example 11, the subject matter of any one or more of Examples 9-10 optionally include the processing circuitry further to: establish a secure path to the object based on a defined scope of the access control object; and facilitate access from the subject to the object based on a permissions constraint of the access control object; wherein the request is received with a communication conducted according to an interconnected device network framework; and wherein the interconnected device network framework is conducted according to an Open Connectivity Foundation (OCF) compliant standard.

Example 12 is at least one machine readable storage medium, comprising a plurality of instructions adapted for determining an access control policy, wherein the instructions, responsive to being executed with processor circuitry of a machine, cause the processing circuitry to: receive a request from a subject to perform an operation with an object, the subject operating in accordance with a first type of access policy, and the object operating in accordance with a second type of access policy; evaluate the first type of access policy of the subject to determine a first access scope with regard to performing the requested operation; evaluate the second type of access policy of the object to determine a second access scope with regard to performing the requested operation; identify an access control object that provides a mapping between the first access scope and the second access scope for the requested operation; and provide access from the subject to the object based on a security level determined from the mapping between the first access scope and the second access scope provided by the access control object.

In Example 13, the subject matter of Example 12 optionally includes the first and second types of access policies being distinct and incompatible, wherein the first type of access policy provides a different number of security levels than the second type of access policy, and wherein the access control object provides a mapping of the first access scope to the second access scope at a lower privilege level.

In Example 14, the subject matter of any one or more of Examples 12-43 optionally include the instructions further identifying the access control object from among a plurality of access control objects.

In Example 15, the subject matter of any one or more of Examples 12-14 optionally include the subject and the object representing different types of: a domain, a zone, a platform, an application, a device type, an interface type, a device, a device state, a resource type, a resource, or a property, and wherein the access control object provides an express matching of the subject to the object based on a permission to perform the requested operation.

In Example 16, the subject matter of Example 15 optionally includes the requested operation being a Create, Retrieve, Update, Delete or Notify (CRUDN) operation.

In Example 1.7, the subject matter of any one or more of Examples 12-16 optionally include the operations that identify the access control object including operations that match the requested operation to a security level defined in the access control object, based on an exit-point scope of the access control object to perform the requested operation.

In Example 18, the subject matter of any one or more of Examples 12-17 optionally include operations that, in response to multiple access control objects matching the subject, select a particular access control object of the multiple access control objects having a most granular scope to perform the requested operation.

In Example 19, the subject matter of any one or more of Examples 12-18 optionally include operations that, in response to multiple access control objects matching the object, select an access control object of the multiple access control objects by: removing access control objects from among the multiple access control objects that are not asserted with a voluntary granularity constraint; and matching a scope of the request from the subject to a scope of a permission to perform the requested operation in remaining multiple access control objects; and computing a union of permissions on the remaining multiple access control objects.

In Example 20, the subject matter of any one or more of Examples 12-19 optionally include the instructions further receiving and utilizing authentication information from the subject to perform the requested operation with the object, the authentication information for the object including credentials.

In Example 21, the subject matter of Example 20 optionally includes the credentials being used to authorize a trusted execution environment to perform actions appropriate for an object scope that is under control of the trusted execution environment.

In Example 22, the subject matter of any one or more of Examples 20-21 optionally include the instructions further: establishing a secure path to the object based on a defined scope of the access control object; and facilitating access from the subject to the object based on a permissions constraint of the access control object; wherein the request is received with a communication conducted according to an interconnected device network framework; and wherein the interconnected device network framework is conducted according to an Open Connectivity Foundation (OCF) compliant standard.

Example 23 is a method of determining an access control policy, the method comprising: receiving a request from a subject to perform an operation with an object, the subject operating in accordance with a first type of access policy, and the object operating in accordance with a second type of access policy; evaluating the first type of access policy of the subject to determine a first access scope with regard to performing the requested operation; evaluating the second type of access policy of the object to determine a second access scope with regard to performing the requested operation; identifying an access control object that provides a mapping between the first access scope and the second access scope for the requested operation; and providing access from the subject to the object based on a security level determined from the mapping between the first access scope and the second access scope provided by the access control object.

In Example 24, the subject matter of Example 23 optionally includes the first and second types of access policies being distinct and incompatible, wherein the first type of access policy provides a different number of security levels than the second type of access policy, and wherein the access control object provides a mapping of the first access scope to the second access scope at a lower privilege level.

In Example 25, the subject matter of any one or more of Examples 23-24 optionally include identifying the access control object from among a plurality of access control objects.

In Example 26, the subject matter of any one or more of Examples 23-25 optionally include the subject and the object representing different types of: a domain, a zone, a platform, an application, a device type, an interface type, a device, a device state, a resource type, a resource, or a property, and wherein the access control object provides an express matching of the subject to the object based on a permission to perform the requested operation.

In Example 27, the subject matter of Example 26 optionally includes the requested operation being a Create, Retrieve, Update, Delete or Notify (CRUDN) operation.

In Example 28, the subject matter of any one or more of Examples 23-27 optionally include identifying the access control object including matching the requested operation to a security level defined in the access control object, based on an exit-point scope of the access control object to perform the requested operation.

In Example 29, the subject matter of any one or more of Examples 23-28 optionally include in response to multiple access control objects matching the subject, selecting a particular access control object of the multiple access control objects having a most granular scope to perform the requested operation.

In Example 30, the subject matter of any one or more of Examples 23-29 optionally include in response to multiple access control objects matching the object, selecting an access control object of the multiple access control objects by: removing access control objects from among the multiple access control objects that are not asserted with a voluntary granularity constraint; and matching a scope of the request from the subject to a scope of a permission to perform the requested operation in remaining multiple access control objects; and computing a union of permissions on the remaining multiple access control objects.

In Example 31, the subject matter of any one or more of Examples 23-30 optionally include receiving and utilizing authentication information from the subject to perform the requested operation with the object, wherein the authentication information for the object includes credentials.

In Example 32, the subject matter of Example 31 optionally includes the credentials being used to authorize a trusted execution environment to perform actions appropriate for an object scope that is under control of the trusted execution environment.

In Example 33, the subject matter of any one or more of Examples 23-32 optionally include establishing a secure path to the object based on a defined scope of the access control object; and facilitating access from the subject to the object based on a permissions constraint of the access control object; wherein the request is received with a communication conducted according to an interconnected device network framework; and wherein the interconnected device network framework is conducted according to an Open Connectivity Foundation (OCF) compliant standard.

Example 34 is at least one machine readable medium including instructions, which when executed by a computing system, cause the computing system to perform any of the methods of Examples 23-33.

Example 35 is an apparatus comprising means for performing any of the methods of Examples 23-33.

Example 36 is an apparatus, comprising: means for receiving a request from a subject to perform an operation with an object, the subject operating in accordance with a first type of access policy, and the object operating in accordance with a second type of access policy; means for evaluating the first type of access policy of the subject to determine a first access scope with regard to performing the requested operation; means for evaluating the second type of access policy of the object to determine a second access scope with regard to performing the requested operation; means for identifying an access control object that provides a mapping between the first access scope and the second access scope for the requested operation; and means for providing access from the subject to the object based on a security level determined from the mapping between the first access scope and the second access scope provided by the access control object.

In Example 37, the subject matter of Example 36 optionally includes means for implementing the access control object to provide a mapping of the first access scope to the second access scope at a lower privilege level, wherein the first and second types of access policies are distinct and incompatible, wherein the first type of access policy provides a different number of security levels than the second type of access policy.

In Example 38, the subject matter of any one or more of Examples 36-37 optionally include means for identifying the access control object from among a plurality of access control objects.

In Example 39, the subject matter of any one or more of Examples 36-38 optionally include means for implementing the access control object to provide an express matching of the subject to the object based on a permission to perform the requested operation, wherein the subject and the object represent different types of: a domain, a zone, a platform, an application, a device type, an interface type, a device, a device state, a resource type, a resource, or a property.

In Example 40, the subject matter of Example 39 optionally includes the requested operation being a Create, Retrieve, Update, Delete or Notify (CRUDN) operation.

In Example 41, the subject matter of any one or more of Examples 36-40 optionally include means for matching the requested operation to a security level defined in the access control object, based on an exit-point scope of the access control object to perform the requested operation.

In Example 42, the subject matter of any one or more of Examples 36-41 optionally include means for selecting a particular access control object of multiple access control objects having a most granular scope to perform the requested operation, in response to the multiple access control objects matching the subject.

In Example 43, the subject matter of any one or more of Examples 36-42 optionally include means for selecting an access control object of multiple access control objects, in response to the multiple access control objects matching the object, including: means for removing access control objects from among the multiple access control objects that are not asserted with a voluntary granularity constraint; and means for matching a scope of the request from the subject to a scope of a permission to perform the requested operation in remaining multiple access control objects; and means for computing a union of permissions on the remaining multiple access control objects.

In Example 44, the subject matter of any one or more of Examples 36-43 optionally include means for receiving and utilizing authentication information from the subject to perform the requested operation with the object, wherein the authentication information for the object includes credentials.

In Example 45, the subject matter of Example 44 optionally includes means for providing the credentials to be used to authorize a trusted execution environment to perform actions appropriate for an object scope that is under control of the trusted execution environment.

In Example 46, the subject matter of any one or more of Examples 44-45 optionally include means for establishing a secure path to the object based on a defined scope of the access control object; and means for facilitating access from the subject to the object based on a permissions constraint of the access control object; wherein the request is received with a communication conducted according to an interconnected device network framework; and wherein the interconnected device network framework is conducted according to an Open Connectivity Foundation (OCF) compliant standard.

Example 47 is at least one machine-readable medium including instructions, which when executed by a machine, cause the machine to perform operations of any of the operations embodied by Examples 1-46.

Example 48 is an apparatus comprising means for performing any of the operations embodied by Examples 1-46.

Example 49 is a system to perform the operations embodied by any of Examples 1-46.

Example 50 is a method to perform the operations embodied by any of Examples 1-46.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device adapted for determining an access control policy, the device comprising processing circuitry to:
   receive a request from a subject to perform an operation with an object, the subject operating in accordance with a first type of access policy, and the object operating in accordance with a second type of access policy;
   evaluate the first type of access policy of the subject to determine a first access scope with regard to performing the requested operation;
   evaluate the second type of access policy of the object to determine a second access scope with regard to performing the requested operation;
   identify an access control object that provides a mapping between the first access scope and the second access scope for the requested operation, wherein to identify the access control object includes matching the requested operation to a security level defined in the access control object, based on an exit-point scope of the access control object to perform the requested operation;
   cause the access control object to map the first access scope and the second access scope for the requested operation, wherein to map the first access scope and the second access scope includes aligning a scoping context for the first access scope and the second access scope; and
   provide access from the subject to the object based on a security level determined from the mapping between the first access scope and the second access scope provided by the access control object.

2. The device of claim 1, wherein the first and second types of access policies are distinct and incompatible, wherein the first type of access policy provides a different number of security levels than the second type of access policy, and wherein the access control object maps the first access scope to the second access scope at a lower privilege level.

3. The device of claim 1, the processing circuitry further to identify the access control object from among a plurality of access control objects.

4. The device of claim 1, wherein the subject and the object represent different types of: a domain, a zone, a platform, an application, a device type, an interface type, a device, a device state, a resource type, a resource, or a property, and wherein the access control object provides an express matching of the subject to the object based on a permission to perform the requested operation.

5. The device of claim 4, wherein the requested operation is a Create, Retrieve, Update, Delete or Notify (CRUDN) operation.

6. The device of claim 1, wherein the operations that identify the access control object include operations that that specify a subject scope element that is authorized to interact with an object scope element.

7. The device of claim 1, wherein in response to multiple access control objects matching the subject, the processing circuitry selects a particular access control object of the multiple access control objects having a more granular scope to perform the requested operation.

8. The device of claim 7, wherein in response to multiple access control objects matching the object, the processing circuitry selects an access control object of the multiple access control objects by:

removing access control objects from among the multiple access control objects that are not asserted with a voluntary granularity constraint;

matching a scope of the request from the subject to a scope of a permission to perform the requested operation in remaining multiple access control objects; and computing a union of permissions on the remaining multiple access control objects.

9. The device of claim 1, the processing circuitry further to:

receive and utilize authentication information from the subject to perform the requested operation with the object, the authentication information for the object including credentials.

10. The device of claim 9, wherein the credentials are used to authorize a trusted execution environment to perform actions appropriate for an object scope that is under control of the trusted execution environment.

11. The device of claim 9, the processing circuitry further to:

establish a secure path to the object based on a defined scope of the access control object;

facilitate access from the subject to the object based on a permissions constraint of the access control object;

wherein the request is received with a communication conducted according to an interconnected device network framework; and wherein the interconnected device network framework is conducted according to an Open Connectivity Foundation (OCF) compliant standard.

12. At least one non-transitory machine-readable storage medium, comprising a plurality of instructions adapted for determining an access control policy, wherein the instructions, responsive to being executed with processor circuitry of a machine, cause the processing circuitry to:

receive a request from a subject to perform an operation with an object, the subject operating in accordance with a first type of access policy, and the object operating in accordance with a second type of access policy;

evaluate the first type of access policy of the subject to determine a first access scope with regard to performing the requested operation;

evaluate the second type of access policy of the object to determine a second access scope with regard to performing the requested operation;

identify an access control object that provides a mapping between the first access scope and the second access scope for the requested operation, wherein to identify the access control object includes matching of the requested operation to a security level defined in the access control object, based on an exit-point scope of the access control object to perform the requested operation;

cause the access control object to map the first access scope and the second access scope for the requested operation, wherein to map the first access scope and the second access scope includes aligning a scoping context for the first access scope and the second access scope; and provide access from the subject to the object based on a security level determined from the mapping between the first access scope and the second access scope provided by the access control object.

13. The machine-readable storage medium of claim 12, wherein the first and second types of access policies are distinct and incompatible, wherein the first type of access policy provides a different number of security levels than the second type of access policy, and wherein the access control object provides a mapping of the first access scope to the second access scope at a lower privilege level.

14. The machine-readable storage medium of claim 12, wherein the instructions further identify the access control object from among a plurality of access control objects, and wherein in response to multiple access control objects matching the subject, a particular access control object of the multiple access control objects having a most granular scope to perform the requested operation is selected.

15. The machine-readable storage medium of claim 12, wherein the subject and the object represent different types of: a domain, a zone, a platform, an application, a device type, an interface type, a device, a device state, a resource type, a resource, or a property, and wherein the access control object provides an express matching of the subject to the object based on a permission to perform the requested operation.

16. The machine-readable storage medium of claim 15, wherein the requested operation is a Create, Retrieve, Update, Delete or Notify (CRUDN) operation.

17. The machine-readable storage medium of claim 12, wherein the instructions further receive and utilize authentication information from the subject to perform the requested operation with the object, wherein the authentication information for the object includes credentials, and wherein the credentials are used to authorize a trusted execution environment to perform actions appropriate for an object scope that is under control of the trusted execution environment.

18. The machine-readable storage medium of claim 12, wherein the instructions further:

establish a secure path to the object based on a defined scope of the access control object; and facilitate access from the subject to the object based on a permissions constraint of the access control object;

wherein the request is received with a communication conducted according to an interconnected device network framework; and wherein the interconnected device network framework is conducted according to an Open Connectivity Foundation (OCF) compliant standard.

19. A method of determining an access control policy, the method comprising:

receiving a request from a subject to perform an operation with an object, the subject operating in accordance with a first type of access policy, and the object operating in accordance with a second type of access policy;

evaluating the first type of access policy of the subject to determine a first access scope with regard to performing the requested operation;

evaluating the second type of access policy of the object to determine a second access scope with regard to performing the requested operation;

identifying an access control object that provides a mapping between the first access scope and the second access scope for the requested operation, wherein identifying the access control object includes matching the requested operation to a security level defined in the access control object, based on an exit-point scope of the access control object to perform the requested operation;

causing the access control object to map the first access scope and the second access scope for the requested operation, wherein to map the first access scope and the second access scope includes aligning a scoping context for the first access scope and the second access scope; and providing access from the subject to the object based on a security level determined from the mapping between the first access scope and the second access scope provided by the access control object.

20. The method of claim 19, wherein the first and second types of access policies are distinct and incompatible, wherein the first type of access policy provides a different number of security levels than the second type of access policy, and wherein the access control object provides a mapping of the first access scope to the second access scope at a lower privilege level.

21. The method of claim 19, further comprising identifying the access control object from among a plurality of access control objects, and wherein in response to multiple access control objects matching the subject, a particular access control object of the multiple access control objects having a most granular scope to perform the requested operation is selected.

22. The method of claim 19, wherein the subject and the object represent different types of: a domain, a zone, a platform, an application, a device type, an interface type, a device, a device state, a resource type, a resource, or a property, and wherein the access control object provides an express matching of the subject to the object based on a permission to perform the requested operation.

23. The method of claim 22, wherein the requested operation is a Create, Retrieve, Update, Delete or Notify (CRUDN) operation.

24. The method of claim 19, further comprising receiving and utilizing authentication information from the subject to perform the requested operation with the object, wherein the authentication information for the object includes credentials, and wherein the credentials are used to authorize a trusted execution environment to perform actions appropriate for an object scope that is under control of the trusted execution environment.

25. The method of claim 19, further comprising:
establishing a secure path to the object based on a defined scope of the access control object; and
facilitating access from the subject to the object based on a permissions constraint of the access control object;
wherein the request is received with a communication conducted according to an interconnected device network framework; and
wherein the interconnected device network framework is conducted according to an Open Connectivity Foundation (OCF) compliant standard.

* * * * *

UNITED STATES PATENT AND TRADEMARK OFFICE
CERTIFICATE OF CORRECTION

PATENT NO. : 11,310,643 B2
APPLICATION NO. : 16/608771
DATED : April 19, 2022
INVENTOR(S) : Smith et al.

Page 1 of 1

It is certified that error appears in the above-identified patent and that said Letters Patent is hereby corrected as shown below:

In the Claims

In Column 26, Line 56, in Claim 6, delete "that that" and insert --that-- therefor Signed and Sealed this
First Day of November, 2022

Katherine Kelly Vidal
*Director of the United States Patent and Trademark Office*